United States Patent
Suzuki

(10) Patent No.: US 11,338,703 B2
(45) Date of Patent: May 24, 2022

(54) SEAT UNIT

(71) Applicant: YAZAKI CORPORATION, Tokyo (JP)

(72) Inventor: Masashi Suzuki, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 244 days.

(21) Appl. No.: 16/852,472

(22) Filed: Apr. 18, 2020

(65) Prior Publication Data

US 2020/0369179 A1   Nov. 26, 2020

(30) Foreign Application Priority Data

May 23, 2019  (JP) .............................. JP2019-096841

(51) Int. Cl.
| | |
|---|---|
| *B60N 2/02* | (2006.01) |
| *B60R 16/033* | (2006.01) |
| *H05B 45/32* | (2020.01) |
| *B60R 16/027* | (2006.01) |
| *B60N 2/00* | (2006.01) |
| *B60R 22/48* | (2006.01) |

(52) U.S. Cl.
CPC ............ *B60N 2/0244* (2013.01); *B60N 2/02* (2013.01); *B60R 16/027* (2013.01); *B60R 16/033* (2013.01); *H05B 45/32* (2020.01); *B60N 2/002* (2013.01); *B60N 2002/0264* (2013.01); *B60N 2002/0268* (2013.01); *B60R 2022/4816* (2013.01)

(58) Field of Classification Search
CPC combination set(s) only.
See application file for complete search history.

(56) References Cited

U.S. PATENT DOCUMENTS

| | | | |
|---|---|---|---|
| 2014/0206302 A1 | 7/2014 | Terada | |
| 2020/0361373 A1* | 11/2020 | Kominato | ............... F21V 14/00 |
| 2020/0369180 A1* | 11/2020 | Suzuki | ..................... B60N 2/06 |

FOREIGN PATENT DOCUMENTS

| | | |
|---|---|---|
| DE | 102004008815 A1 | 9/2005 |
| DE | 102015222687 A1 | 5/2017 |
| JP | 2013-67322 A | 4/2013 |

* cited by examiner

*Primary Examiner* — Long Nguyen
(74) *Attorney, Agent, or Firm* — Kenealy Vaidya LLP

(57) ABSTRACT

A seat unit includes a light receiving circuit configured to output a pulsed light detection signal in two levels depending on a light reception, a switch input circuit configured to output a pulsed on-off signal in two levels depending on whether a switch mounted on the seat is turned on or turned off, a logic circuit configured to output a turn-on signal upon receipt of the light detection signal in a level indicating the light reception and the on-off signal in a turn-on level, a light emitting circuit configured to emit light upon receipt of the turn-on signal, and a delay circuit configured to delay the light detection signal. The switch input circuit cuts off, upon receipt of the delayed light detection signal in a level indicating no light reception, the power supply from a battery to the switch and to output the on-off signal in the turn-on level.

4 Claims, 9 Drawing Sheets

*FIG. 5*

| LIGHT DETECTION SIGNAL | ON-OFF SIGNAL | LOGIC CIRCUIT OUTPUT |
|---|---|---|
| Lo | Lo | Hi (TURN-ON SIGNAL S3) |
| Hi | Lo | Lo (TURN-OFF SIGNAL S4) |
| Lo | Hi | Lo (TURN-OFF SIGNAL S4) |
| Hi | Hi | Lo (TURN-OFF SIGNAL S4) |

FIG. 7

| T1 | T2 | DETERMINATION RESULT |
|---|---|---|
| NO LIGHT RECEPTION | — | SYSTEM ABNORMALITY |
| LIGHT RECEPTION | LIGHT RECEPTION | SWITCH ON |
| | NO LIGHT RECEPTION | SWITCH OFF |

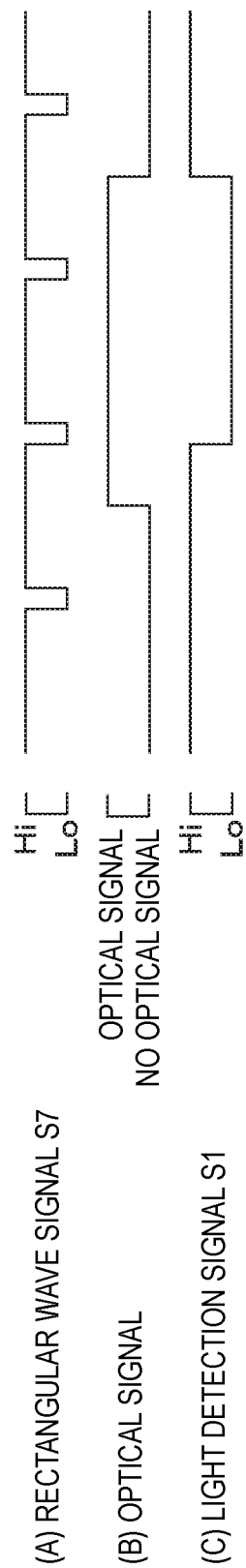

SEAT UNIT

CROSS-REFERENCE TO RELATED APPLICATION

The present application claims priority from Japanese Patent Application No. 2019-096841 filed on May 23, 2019, the entire content of which is incorporated herein by reference.

BACKGROUND

The invention relates to a seat unit configured to be mounted on a vehicle seat and that operates upon receiving power supply from a battery.

A related art signal receiving device performs infrared communication between a slide seat and a vehicle, and uses a battery as a power source of a slide seat side, so that routing of wire harness between the slide seat and the vehicle is avoided (see, e.g., JP2013-67322A).

However, according to the signal receiving device described above, information is transmitted from the slide seat to the vehicle even when communication with the slide seat is not required. For this reason, battery exhaustion occurs quickly.

Therefore, a light emitting device and a light detecting device are provided on the slide seat to enable two-way communication between the slide seat and the vehicle. Further, power saving may be achieved by transmitting information from the slide seat to the vehicle only when a start signal is received from the vehicle.

However, the two-way communication between the slide seat and the vehicle complicates control of the light emitting device and of the light detecting device. Further, if the battery exhaustion of the slide seat can be detected at the vehicle side by, for example, transmitting a response signal when the slide seat receives the start signal, the control is further complicated. For this reason, a microcomputer is used for the control, which results in cost increase.

SUMMARY

Illustrative aspects of the present invention provide a seat unit that can reduce cost by performing communication such that a failure such as battery exhaustion can be detected on the vehicle side without using a microcomputer.

According to an illustrative aspect of the invention, a seat unit is configured to be mounted on a seat of a vehicle and to receive power supply from a battery to operate. The seat unit includes a light receiving circuit including a light detecting device, the light receiving circuit being configured to output a pulsed light detection signal in two levels depending on whether the light detecting device is detecting a light reception, a switch input circuit configured to output a pulsed on-off signal in two levels depending on whether a switch mounted on the seat is turned on or turned off, a logic circuit configured to output a turn-on signal upon receipt of the light detection signal in a level indicating the light reception and the on-off signal in a turn-on level, the turn-on level being one of the two levels of the on-off signal, a. light emitting circuit including a light emitting device and the light emitting circuit being configured to cause the light emitting device to emit light upon receipt of the turn-on signal, and a delay circuit configured to delay the light detection signal. The switch input circuit is configured to cut off, upon receipt of the delayed light detection signal in a level indicating no light reception, the power supply from the battery to the switch and to output the on-off signal in the turn-on level.

Other aspects and advantages of the invention will be apparent from the following description, the drawings and the claims.

BRIEF DESCRIPTION OF THE DRAWINGS

FIG. 5 is a table illustrating relationships among a turn-on signal S3 and a turn-off signal S4 that are from a logic circuit, a light detection signal S1, and an on-off signal S2, which are illustrated in FIG. 2;

FIG. 7 is a table illustrating relationships among light reception from a seat unit in a failure determination period T1 and a switch input period T2 and a determination of a vehicle unit;

FIG. 10 is a timing chart of a rectangular wave signal, an optical signal from a vehicle unit and the light detection signal S1 illustrated in FIG. 8.

DETAILED DESCRIPTION

Hereinafter, exemplary embodiments of the present invention will be described with reference to the drawings.

Figure 1:
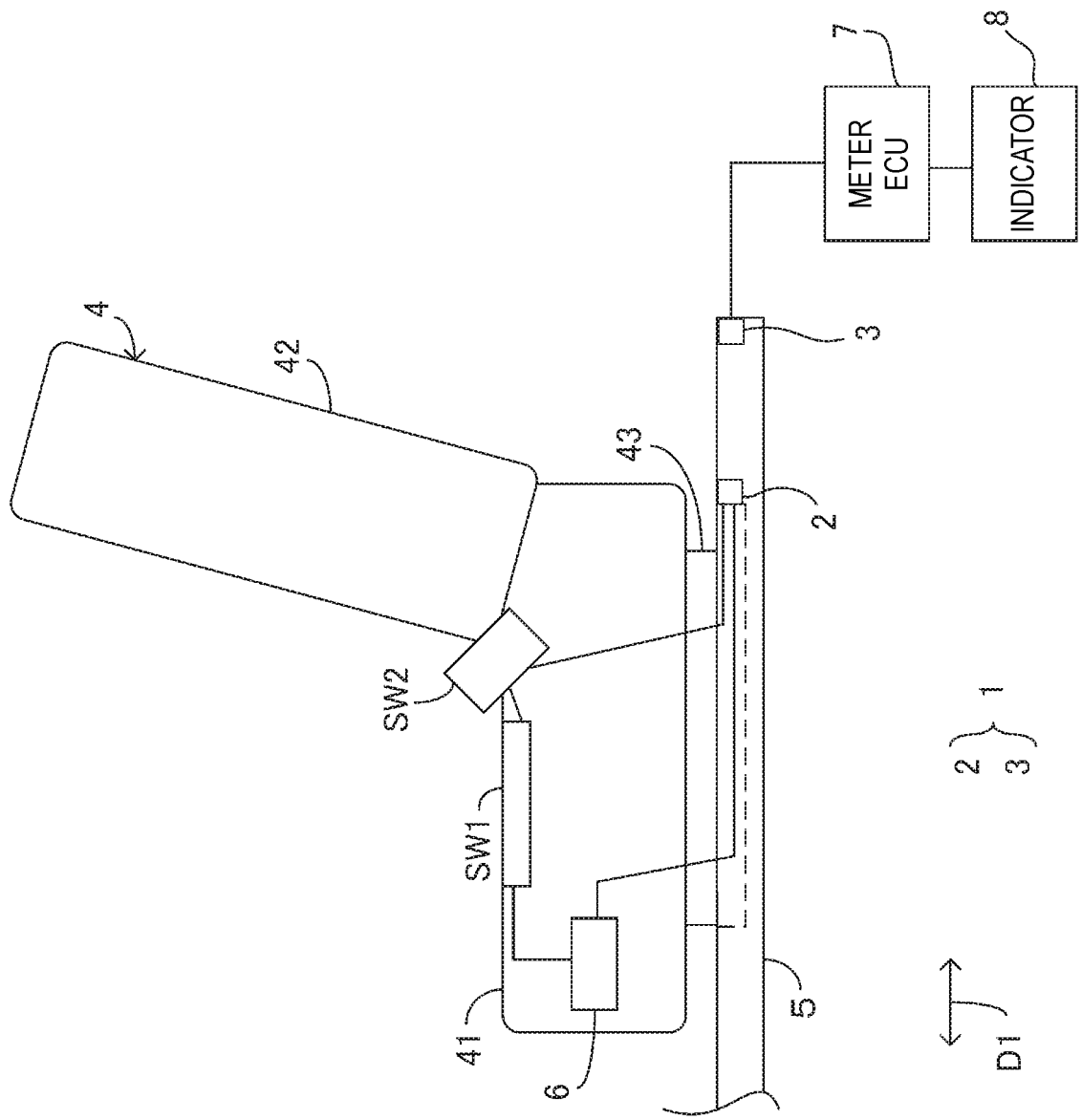
FIG. 1 is a schematic configuration diagram illustrating a communication system including a seat unit according to an exemplary embodiment of the present invention.

As illustrated in FIG. 1, a communication system 1 includes a seat unit 2 provided on a slide seat 4 (seat) and a vehicle unit 3 provided on a vehicle (vehicle body). The communication system 1 is a system that transmits, optically and wirelessly, an on-off state of a seating switch SW1 and a buckle switch SW2, which are disposed on the slide seat 4, from the seat unit 2 to the vehicle unit 3.

The slide seat 4 is mounted on the vehicle, and includes a seat cushion 41, a seat back 42, and an upper rail 43. With the upper rail 43 attached to a lower surface of the seat cushion 41, and with a rail 5 that is disposed below the seat cushion 41 and to which the upper rail 43 is slidably attached, the slide seat 4 is slidable along a front-rear direction D1 of the vehicle.

The seating switch SW1 is one of switches mounted on the slide seat 4. The seating switch SW1 is, for example, disposed in the seat cushion 41, is pressed to be turned on when an occupant sits on the slide seat 4, and is turned off when the occupant leaves the slide seat 4. Seating of the occupant can be detected based on an on-off state of the seating switch SW1.

The buckle switch SW2 is one of the switches mounted on the slide seat 4. The buckle switch SW2 is provided in a buckle of a seat belt, is turned off when a tongue thereof is inserted into the buckle of the seat belt, and is turned on when the tongue is pulled out. Seat belt wearing of the occupant can be detected based on an on-off state of the buckle switch SW2.

One seat unit 2 is mounted on one slide seat 4, and operates depending on a battery 6. In the present embodiment, the battery 6 is constituted by a primary battery that cannot be charged, and is, for example, a battery that needs to be regularly replaced, such as at the time of vehicle inspections.

Further, the seat unit 2 may be mounted on all slide seats 4 (driver's seat, assistant driver's seat and rear seats) mounted on the vehicle, may be mounted on only the slide seat 4 serving as the driver's seat, or may be mounted on only the slide seats 4 serving as the driver's seat and the assistant driver's seat.

For example, the seat unit 2 is attached to the upper rail 43, and a light detecting device 221A and a light emitting device 251, which will be described below, are arranged to face a light emitting device and a light detecting device (not illustrated) of the vehicle unit 3 attached to the rail 5. Accordingly, it is possible to perform optical wireless communication between the seat unit 2 and the vehicle unit 3.

The vehicle unit 3 transmits an optical signal to the seat unit 2 at a timing when an on-off state of the switches SW1 and SW2 is desired to be determined, for example, during a period in which an ignition switch is on or during a period in which the ignition switch is on and a vehicle speed is equal to or larger than a predetermined value.

The seat unit 2 turns on the light emitting device 251 regardless of the on-off state of the switches SW1 and SW2 to output an optical signal, during a period (hereinafter, referred to as a failure determination period) from a start of light reception of the optical signal from the vehicle unit 3 to elapse of a predetermined delay time. Accordingly, in the failure determination period, the vehicle unit 3 can perform system abnormality determination of the seat unit 2 based on presence or absence of an optical signal from the seat unit 2.

During a period (hereinafter, referred to as a switch input determination period) from the elapse of the delay time to an end of the light reception of the optical signal from the vehicle unit 3, the seat unit 2 outputs an optical signal while both of the switches SW1 and SW2 are on, and does not output an optical signal while either of the switches SW1 and SW2 is off. Accordingly, in the switch input determination period, the vehicle unit 3 can perform on and off determination of the switches SW1 and SW2 based on presence or absence of an optical signal from the seat unit 2.

Figure 2:
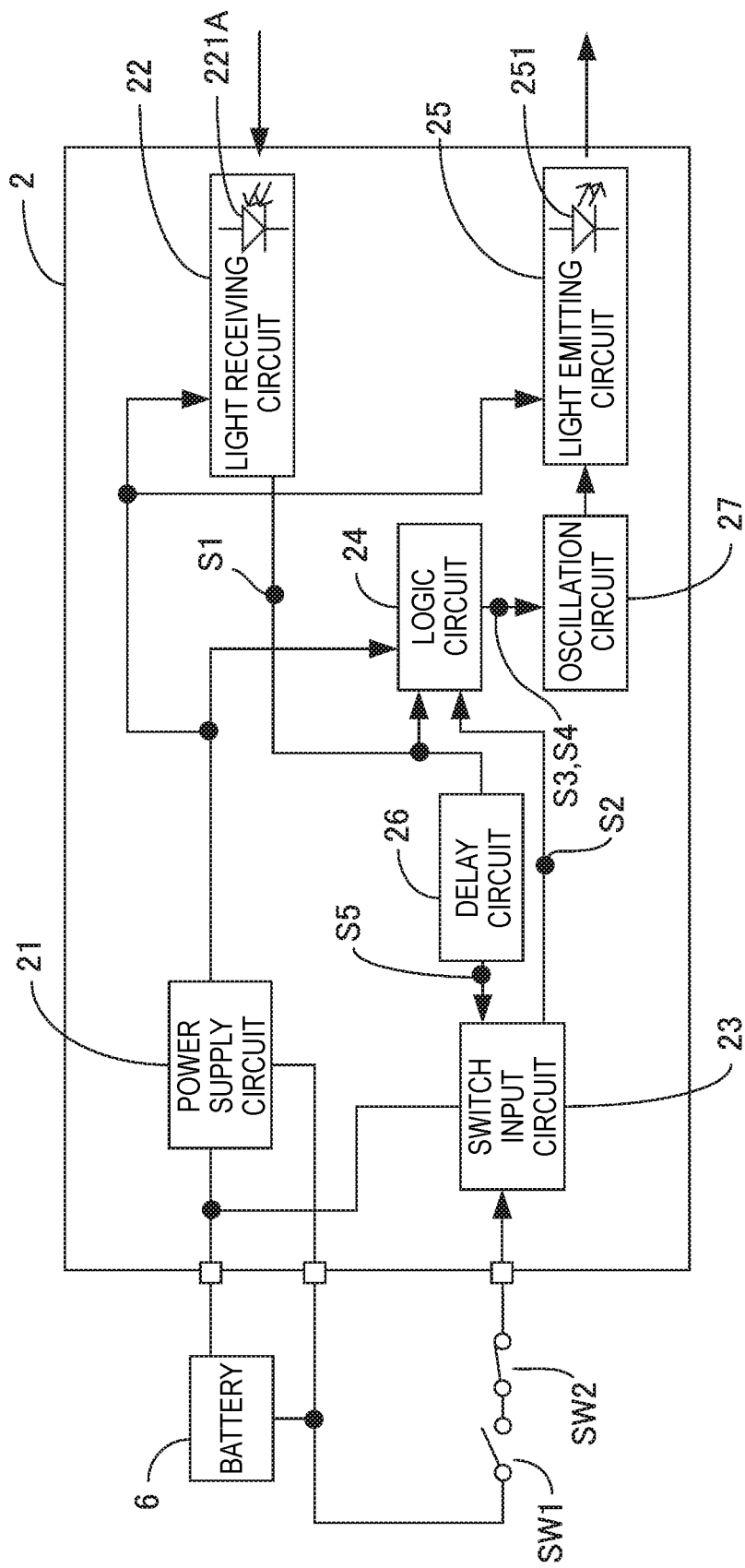
FIG. 2 is an electrical configuration diagram of the seat unit illustrated in FIG. 1.

As illustrated in FIG. 2, the seat unit 2 for implementing the operation described above includes a power supply circuit 21, a light receiving circuit 22, a switch input circuit 23, a logic circuit 24, a light emitting circuit 25, a delay circuit 26, and an oscillation circuit 27.

Figure 3:
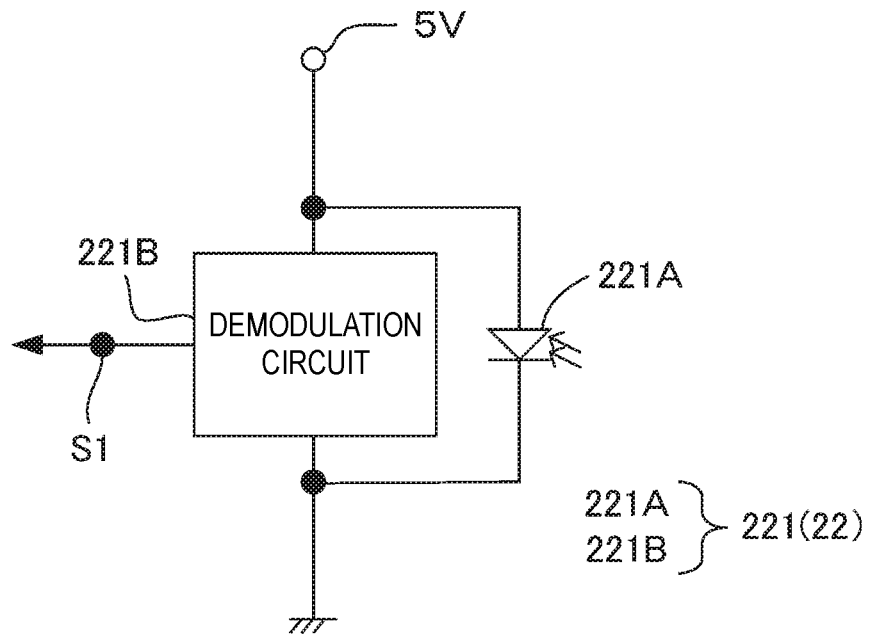
FIG. 3 is an electrical configuration diagram illustrating an example of a light receiving circuit illustrated in FIG. 2.

The power supply circuit 21 is a well-known constant voltage source that generates a power supply of 5V from the battery 6. As illustrated in FIG. 3, the light receiving circuit 22 includes a light detecting device 221. The light detecting device 221 includes the light detecting device 221A and a demodulation circuit 221B. The light detecting device 221A is constituted by, for example, a photodiode, and is a semiconductor device that converts an optical signal into an electrical signal. In the present embodiment, a pulsed optical signal of 38 kHz is output from the vehicle unit 3, and the light detecting device 221A receives and converts the pulsed optical signal into a pulsed electrical signal of 38 kHz.

The demodulation circuit 221B demodulates the pulsed electrical signal from the light detecting device 221A, and outputs a pulsed light detection signal S1 of a Lo level when the light detecting device 221A receives the pulsed optical signal and outputs a pulsed light detection signal S1 of a Hi level when the light detecting device 221A does not receive the pulsed optical signal.

Figure 4:
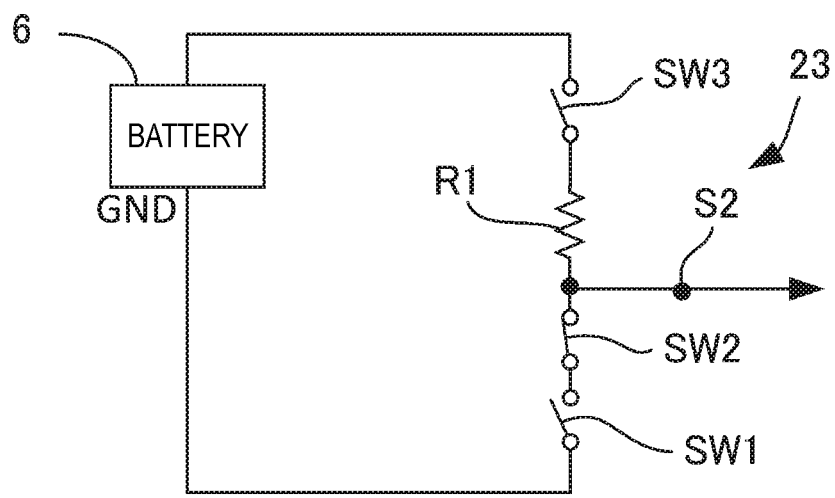
FIG. 4 is an electrical configuration diagram illustrating an example of a switch input circuit illustrated in FIG. 2.

The switch input circuit 23 is a circuit that outputs a pulsed on-off signal S2 of a Hi level and a Lo level in accordance with an on-off state of the switches SW1 and SW2 mounted on the slide seat 4. As illustrated in FIG. 4, the switch input circuit 23 includes a current limiting resistor R1 and a switch SW3 that is connected in series to the current limiting resistor R1. In the switch input circuit 23 the current limiting resistor R1, and the seating switch SW1 and the buckle switch SW2 are connected in series between both ends of the battery 6. The switch input circuit 23 is a well-known switch on and off detection circuit that outputs a voltage between the current limiting resistor R1 and the switches SW1 and SW2 as an on-off signal S2.

In the present embodiment, the seating switch SW1 and the buckle switch SW2 are connected in series to a low side between the ground and the switch input circuit 23. Accordingly, when both of the switches SW1 and SW2 are turned on, a pulsed on-off signal S2 of a Lo level is output from the switch input circuit 23, and when either of the switches SW1 and SW2 is turned off, a pulsed on-off signal S2 of a Hi level is output from the switch input circuit 23. The switch SW3 is constituted by a transistor or the like, and is connected closer to a positive electrode side of the battery 6 than the current limiting resistor R1.

When the switch SW3 is turned on, a current flows from the battery 6 to the switches SW1 and SW2, and the switch input circuit 23 outputs an on-off signal S2 corresponding to the on-off state of the switches SW1 and SW2 as described above. On the other hand, when the switch SW3 is turned off, the current from the battery 6 to the switches SW1 and SW2 is cut off, and the switch input circuit 23 outputs an on-off signal S2 of a Lo level regardless of the on-off state of the switches SW1 and SW2.

The logic circuit 24 receives the light detection signal S1 and the on-off signal S2, and as illustrated in FIG. 5, outputs a turn-on signal S3 of a Hi level or a turn-off signal S4 of a Lo level depending on the levels of the light detection signal S1 and the on-off signal S2.

In the present embodiment, when a light detection signal S1 of a Lo level indicating light reception is input and an on-off signal S2 of a Lo level (turn-on level) is input, the logic circuit 24 outputs the turn-on signal S3 of a Hi level. Even if the light detection signal S1 of a Lo level is input, the logic circuit 24 outputs a turn-off signal S4 of a Lo level when the on-off signal S2 is of a Hi level. When a light detection signal S1 of a Hi level indicating no light reception is input, the logic circuit 24 outputs the turn-off signal S4 of a Lo level whether the on-off signal S2 is of a Hi level or a Lo level.

As illustrated in FIG. 2, the light emitting circuit 25 includes the light emitting device 251 such as a light emitting diode, turns on the light emitting device 251 when the turn-on signal S3 is output from the logic circuit 24, and turns off the light emitting device 251 when the turn-off signal S4 is output from the logic circuit 24.

The delay circuit 26 inverts the light detection signal S1 from the light receiving circuit 22 and delays the light detection signal S1 for a predetermined delay time. The delay circuit 26 is a well-known signal delay circuit constituted by a capacitor, a hysteresis comparator, or the like.

A light detection signal S5 delayed and inverted by the delay circuit 26 is input to the switch SW3 (FIG. 4) of the switch input circuit 23. Since the light detection signal S5 is inverted, a Hi level thereof indicates light reception, and a Lo level thereof indicates no light reception. The switch SW3 is turned off when a delayed light detection signal S5 of a Lo level indicating no light reception is input. Accordingly, power from the battery 6 to the switches SW1 and SW2 is cut off, and an on-off signal S2 of a Lo level is output. On the other hand, the switch SW3 is turned on when a delayed light detection signal S5 of a Hi level indicating light reception is input. Accordingly, power is supplied from the battery 6 to the switches SW1 and SW2, and an on-off signal S2 of a Hi level and a Lo level is output in accordance with the on-off state of the switches SW1 and SW2.

The turn-on signal S3 and the turn-off signal S4, which are from the logic circuit 24, are input to the oscillation circuit 27. When a turn-on signal S3 of a Hi level is input from the logic circuit 24, the oscillation circuit 27 oscillates to output a pulsed signal of 38 kHz to the light emitting circuit 25. Accordingly, the light emitting device 251 flashes to output an optical signal of 38 kHz. On the other hand, when a turn-off signal S4 of a Lo level is input from the logic circuit 24, the oscillation circuit 27 stops outputting the pulsed signal. Accordingly, the light emitting device 251 is turned off.

Figure 6:
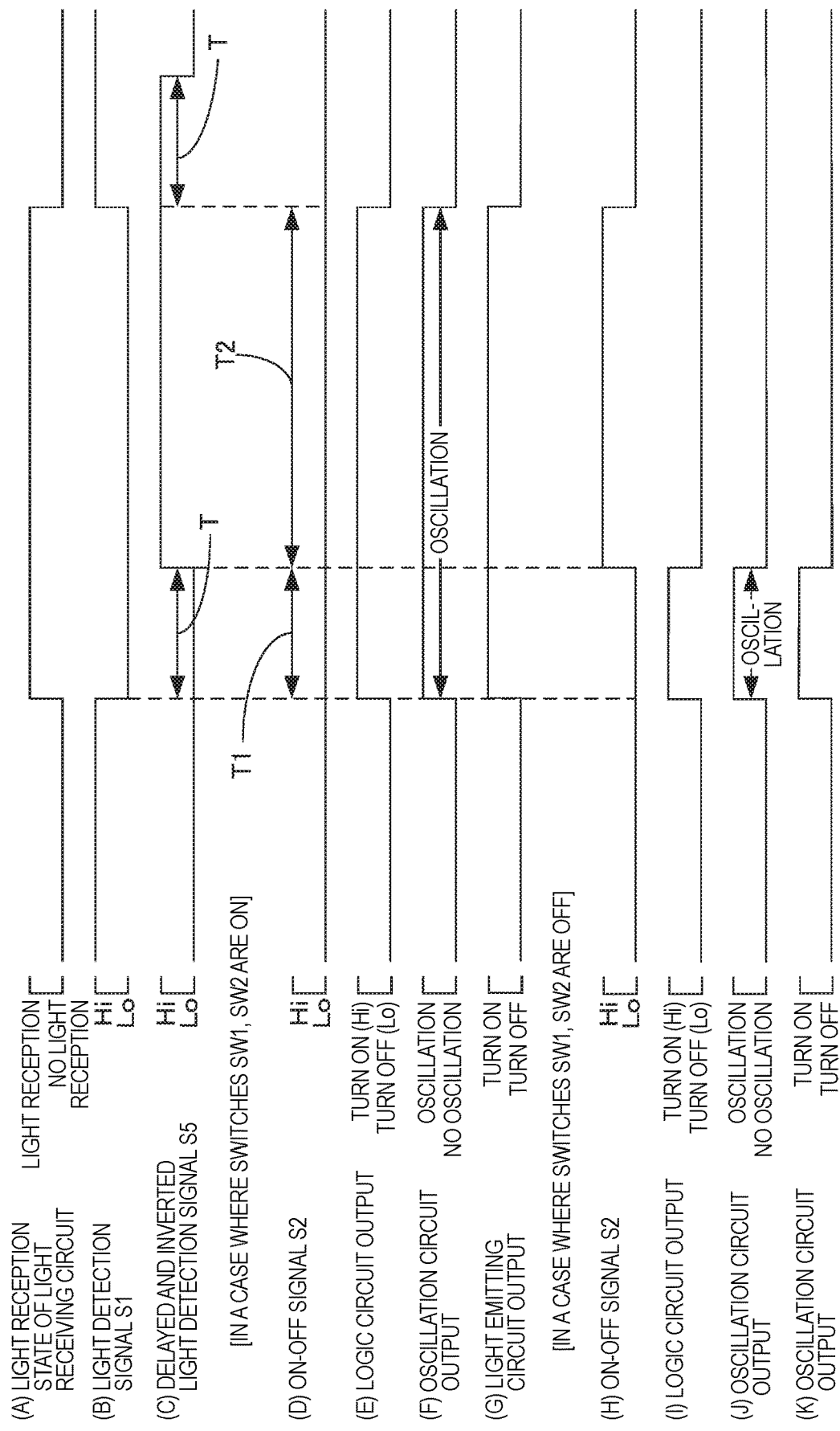
FIG. 6 is a timing chart illustrating a light detecting condition, light detection signals S1 and S5 at the light receiving circuit illustrated in FIG. 2 (A to C), an on-off signal S2 and outputs of the logic circuit, the oscillation circuit and the light emitting circuit illustrated in FIG. 2 in a case where switches SW1 and SW2 are turned on (D to G), and the on-off signal S2 and outputs of the logic circuit, the oscillation circuit and the light emitting circuit in a case where the switches SW1 and SW2 are turned off (H to K)

Operations of the seat unit 2 configured as described above will be described below with reference to the timing chart of FIG. 6. First, when the light receiving circuit 22 does not receive an optical signal from the vehicle unit 3, the light receiving circuit 22 outputs a light detection signal S1 of a Hi level indicating no light reception (FIG. 6-A and B). At this time, the delay circuit 26 outputs a light detection signal S5 of a Lo level indicating no reception, which is obtained by inverting a light detection signal S1 is output (FIG. 6-C).

During a period in which the light detection signal S5 is at a Lo level, the switch SW3 of the switch input circuit 23 is turned off Accordingly, the switch input circuit 23 outputs an on-off signal S2 of a Lo level (FIG. 6-D and H). That is, since the light detection signal S1 of a Hi level and the on-off signal S2 of a Lo level are output during a period in which the optical signal is not being received from the vehicle unit 3, the logic circuit 24 outputs a turn-off signal S4 of a Lo level (FIG. 6-E and I).

Thereafter, when starting receiving the optical signal from the vehicle unit 3, the light receiving circuit 22 switches the light detection signal S1 from a Hi level (no light reception) to a Lo level (light reception) (FIG. 6-A and B). The delay circuit 26 switches the light detection signal S5 from a Lo level to a Hi level after a delay time T has elapsed since a timing at which the light detection signal S1 is switched from a Hi level to a Lo level (FIG. 6-C).

Therefore, in a failure determination period T1, input of a light detection signal S5 of a Lo level to the switch input circuit 23 is maintained, and the switch SW3 is maintained to be off. Therefore, in the failure determination period T1, the on-off signal S2 is at a Lo level regardless of the state of the switches SW1 and SW2 (FIG. 6-D and H). In the failure determination period T1, since the light detection signal S1 of a Lo level and the on-off signal S2 of a Lo level are input to the logic circuit 24, a turn-on signal S3 of a Hi level is output (FIG. 6-E and I). In response to the output of the turn-on signal S3, the oscillation circuit 27 oscillates (FIG. 6-F and J), and causes the light emitting device 251 to flash (FIG. 6-G and K).

Thereafter, when the delay time T elapses and a switch input determination period T2 is reached, the light detection signal S5 is switched from a Lo level to a Hi level (FIG. 6-C). Accordingly, the switch SW3 of the switch input circuit 23 is turned on, and a current can be supplied to the switches SW1 and SW2. That is, when both of the switches SW1 and SW2 are on, the on-off signal S2 is maintained Lo in the switch input determination period T2 (FIG. 6-D). Accordingly, the input of the light detection signal S1 of a Lo level and the on-off signal S2 of a Lo level to the logic circuit 24 is maintained, and thus the turn-on signal S3 of a Hi level is maintained (FIG. 6-E), When the output of the turn-on signal S3 is maintained, the oscillation of the oscillation circuit 27 is maintained (FIG. 6-F), and the flashing of the light emitting device 251 is maintained (FIG. 6-G).

When one of the switches SW1 and SW2 is off, the on-off signal S2 is switched from a Lo level to a Hi level in the switch input determination period T2 (FIG. 6-H). Accordingly, the light detection signal S1 of a Lo level and the on-off signal S2 of a Hi level are input to the logic circuit 24, and thus a turn-off signal S4 of a Lo level is output (FIG. 6-I). When the turn-off signal S4 is output, the oscillation of the oscillation circuit 27 is stopped (FIG. 6-J), and the light emitting device 251 is turned off (FIG. 6-K).

Thereafter, when reception of the optical signal from the vehicle unit 3 stops, the light receiving circuit 22 switches the light detection signal S1 from a Lo level to a Hi level (FIG. 6-A and B). When the light detection signal S1 is at a Hi level, the logic circuit 24 outputs the turn-off signal S4 regardless of the level of the on-off signal S2 (FIG. 6-E and I). The delay circuit 26 switches the light detection signal S5 from a Hi level to a Lo level after the delay time T has elapsed since a timing at which the light detection signal S1 is switched from a Lo level to a Hi level (FIG. 6-C).

The vehicle unit 3 counts time since the transmission of the optical signal, and determines whether the time is the failure determination period T1 or the switch input determination period T2 based on a count value thereof. As illustrated in FIG. 7, when there is no light reception from the seat unit 2 during the failure determination period T1, the vehicle unit 3 determines a system abnormality such as battery exhaustion, and transmits the determination result to a meter ECU 7 (FIG. 1). The meter ECU 7 controls an indicator 8 (FIG. 1) to notify the system abnormality.

When there is light reception from the seat unit 2 during the failure determination period T1, the vehicle unit 3 determines that a system abnormality such as battery exhaustion does not occur. The vehicle unit 3 determines that both the seating switch SW1 and the buckle switch SW2 are on when there is light reception from the seat unit 2 during the switch input determination period T2 that is from elapse of the delay time T to stop of the transmission of the optical signal. That is, the vehicle unit 3 determines that the occupant is seated and the buckle is not fitted, and transmits the determination result to the meter ECU 7. The meter ECU 7 controls the indicator 8 to notify that the seat belt is not worn.

On the other hand, if there is no light reception from the seat unit 2 during the switch input determination period T2, the vehicle unit 3 determines that one of the seating switch SW1 and the buckle switch SW2 is off. That is, it is determined that the occupant is not seated, and particularly nothing is performed.

According to the seat unit 2 configured as described above, it is possible to reduce the cost by performing communication such that a failure such as battery exhaustion can be detected on the vehicle unit 3 side without using a microcomputer. Power to the switches SW1 and SW2 is cut off when a delayed light detection signal S5 of a level indicating no light reception is input to the switch input circuit 23, and the power is not constantly supplied. Therefore, power saving can be achieved.

According to the seat unit 2 configured as described above, the light emitting device 251 can be flashed by providing the oscillation circuit 27.

Figure 8:
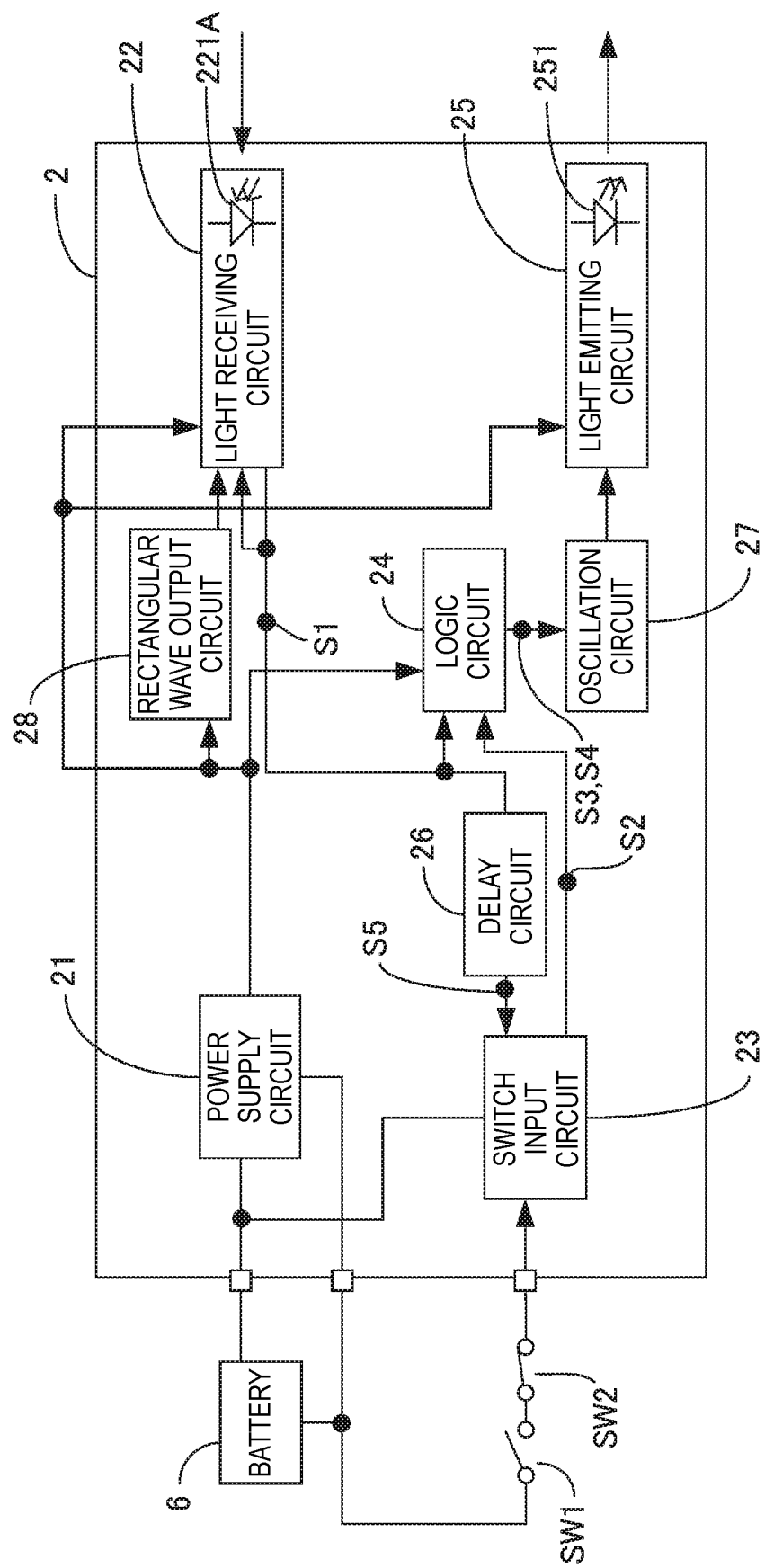
FIG. 8 is an electrical configuration diagram of the seat unit illustrated in FIG. 1 according to another exemplary embodiment of the present invention.
Figure 9:
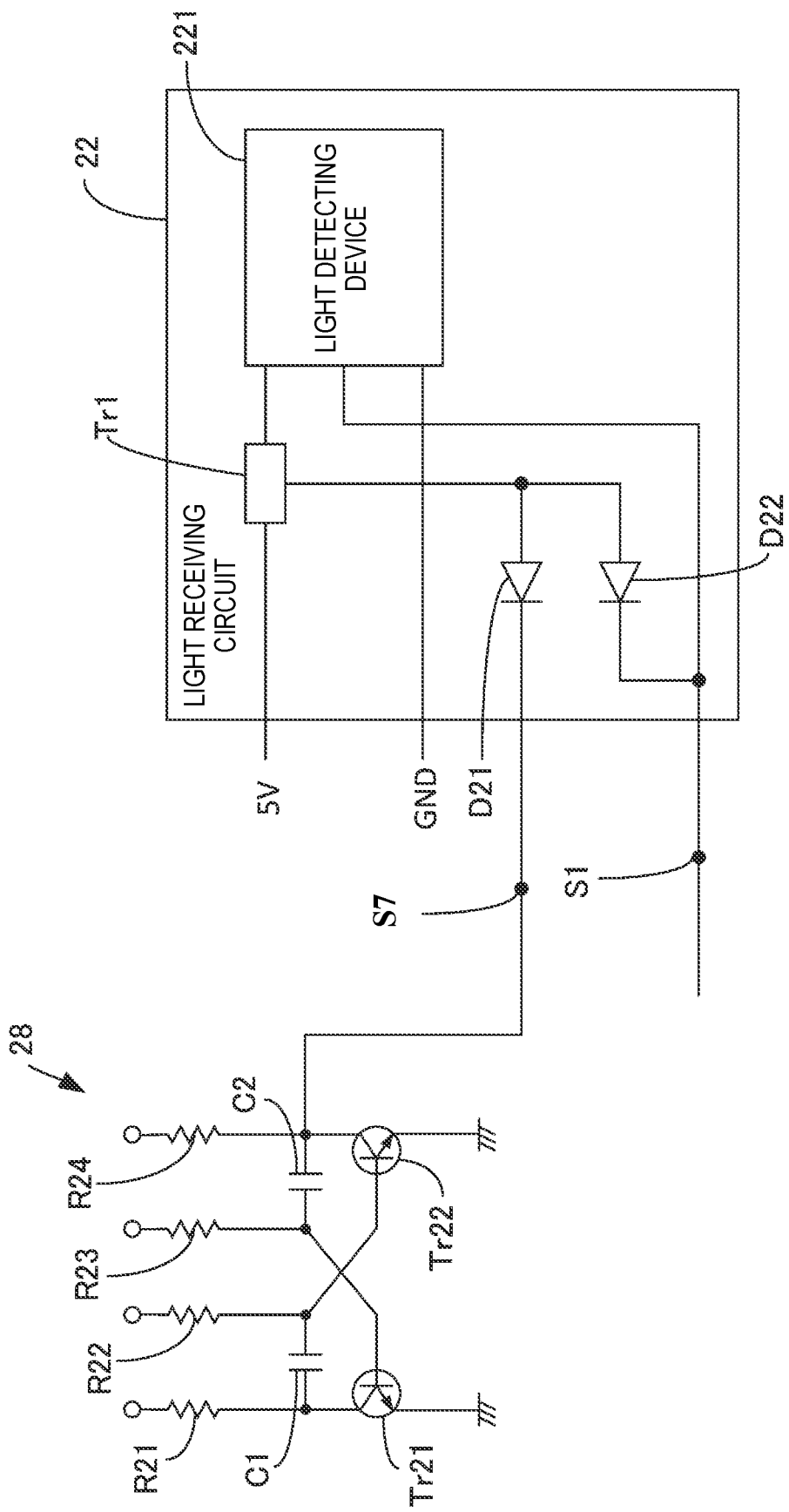
FIG. 9 is an electrical configuration diagram of a rectangular wave output circuit and a light receiving circuit that are illustrated in FIG. 8.

Next, the communication system 1 according to another exemplary embodiment will be described below with reference to FIGS. 8 and 9. In the exemplary embodiment described above, power is constantly supplied to the light receiving circuit 22. The following exemplary embodiment is different in that power is intermittently supplied to the light receiving circuit 22. In FIGS. 8 and 9, the same reference numerals are given to the same parts as those already described in the exemplary embodiment described above with reference to FIG. 2, and a detailed description thereof will be omitted.

As illustrated in FIG. 8, the seat unit 2 further includes a rectangular wave output circuit 28, the power supply circuit 21, the light receiving circuit 22, the switch input circuit 23, the logic circuit 24, the light emitting circuit 25, the delay circuit 26, and the oscillation circuit 27. As illustrated in FIG. 9, the rectangular wave output circuit 28 is constituted by a so-called non-stable multi-vibrator which includes resistors R21 to R24, capacitors C1 and C2, and 2 transistors Tr21 and Tr22, and in which duty can be adjusted by adjusting the resistors R21 to R24 and the capacitors C1 and C2. The rectangular wave output circuit 28 regularly outputs a rectangular wave signal S7 of a Hi level and a Lo level based on power supply of the power supply circuit 21. Since the power supply circuit 21 is the same as that of the first exemplary embodiment, a detailed description thereof will be omitted.

The light receiving circuit 22 includes the light detecting device 221 constituted by the light detecting device 221A and the demodulation circuit 221B, a PNP transistor Tr1 (switch element), and diodes D21 and D22 for preventing backflow. The transistor Tr1 has a collector and an emitter which are connected between a 5V power supply of the power supply circuit 21 and the light detecting device 221. A base (control terminal) is branched into two, one of which is connected to the rectangular wave output circuit 28 via the diode D21, and the other of which is connected to output of the light detecting device 221 via the diode D22. The diode D21 is connected such that a forward direction thereof is from the transistor Tr1 toward the rectangular wave output circuit 28. The diode D22 is connected such that a forward direction thereof is from the transistor Tr1 toward the light detecting device 221.

The transistor Tr1 is turned on when either of a rectangular wave signal S7 from the rectangular wave output circuit 28 and a light detection signal S1 output from the light detecting device 221 is Lo.

Next, operations of the light receiving circuit 22 of the communication system 1 configured as described above will be described below with reference to a timing chart of FIG. 10. In the communication system 1, since the circuits 21, and 23 to 27 excluding the light receiving circuit 22 are the same as those of the first exemplary embodiment, a detailed description thereof will be omitted.

Every time the rectangular wave signal S7 is at the same level as a turn-on level (Lo level in the present embodiment) of the light detection signal S1, power is supplied to the light detecting device 221A. During a period in which no optical signal is being transmitted from the vehicle unit 3, a light detection signal S1 of a Hi level is output. On the other hand, even when the vehicle unit 3 starts transmitting the optical signal, since no power is supplied to the light detecting device 221A when the rectangular wave signal S7 is at a Hi level, the light detection signal Si remains at a Hi level.

Thereafter, when the rectangular wave signal S7 is switched to a Lo level, power is supplied to the light detecting device 221A, and the light detection signal S1 is switched from a Hi level (no light reception) to a Lo level (light reception). Thereafter, since the reception signal S1 is at a Lo level even when the rectangular wave signal S7 is switched to a Hi level, supply of a Lo level signal to the base of the transistor Tr1 is maintained. Therefore, the transistor Tr1 is maintained on, the power supply to the light detecting device 221A is also maintained, and the light detection signal S1 is maintained at a Lo level. Thereafter, when the transmission of the optical signal from the vehicle unit 3 is stopped, the light detection signal S1 is switched from a Lo level to a Hi level.

According to this exemplary embodiment described above, intermittent power supply to the light detecting device 221A can be performed, and power saving can be achieved.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to the embodiments described above, the light detection signal S1 of a Hi level indicates no light reception, and the light detection signal S1 of a Lo level indicates light reception, and the invention is not limited thereto. The light detection signal S1 of a Lo level may indicate light reception and the light detection signal S1 of a Hi level may indicate no light reception. In this case, when the light detection signal S1 of a Hi level and an on-off signal S2 of a Lo level are input, the logic circuit 24 outputs the turn-on signal S3.

Further, according to the embodiments described above, the switches SW1 and SW2 are provided on the low side in the switch input circuit 23, and the switch input circuit 23 outputs an on-off signal S2 of a Lo level when the switches SW1 and SW2 are turned on and outputs an on-off signal S2 of Hi level when the switches SW1 and SW2 are turned off, and the invention is not limited thereto. The switches SW1 and SW2 may be provided on a high side, an on-off signal S2 of a Hi level may be output when the switches SW1 and SW2 are turned on, and an on-off signal S2 of a Lo level may be output when the switches SW1 and SW2 are turned off.

Further, according to the embodiments described above, the turn-on signal S3 is output when an on-off signal S2 of a Lo level is input with the Lo level as a turn-on level, and the invention is not limited thereto. The turn-on signal S3 may be output when an on-off signal S2 of a Hi level is input with the Hi level as a turn-on level. In this case, as illustrated in the first embodiment, when the switches SW1 and SW2 are connected to the low side, the on-off signal S2 of a Hi level indicates off of the switches SW1 and SW2. On the vehicle unit 3 side, when light from the seat unit 2 is received in the switch input determination period T2, it is determined that the switches SW1 and SW2 are turned off, and when no light is received, it is determined that the switches SW1 and SW2 are turned on.

According to an aspect of the exemplary embodiments described above, a seat unit (2) is configured to be mounted on a seat (4) of a vehicle and to receive power supply from a battery (6) to operate. The seat unit (2) includes a light receiving circuit (22) including a light detecting device (221A), the light receiving circuit (22) being configured to output a pulsed light detection signal (S1) in two levels depending on whether the light detecting device (221A) is detecting a light reception, a switch input circuit (23) configured to output a pulsed on-off signal (S2) in two levels depending on whether a switch (SW1, SW2) mounted on the seat (4) is turned on or turned off, a logic circuit (24) configured to output a turn-on signal (S3) upon receipt of the light detection signal (S1) in a level indicating the light reception and the on-off signal (S2) in a turn-on level, the turn-on level being one of the two levels of the on-off signal (S2), a light emitting circuit (25) including a light emitting device (251), and the light emitting circuit (25) being configured to cause the light emitting device (251) to emit light upon receipt of the turn-on signal (S1), and a delay circuit (26) configured to delay the light detection signal (S1).

The switch input circuit (23) is configured to cut off, upon receipt of the delayed light detection signal (S5) in a level indicating no light reception, the power supply from the battery (6) to the switch (SW1, SW2) and to output the on-off signal (S2) in the turn-on level.

With this configuration, when the light receiving circuit starts receiving an optical signal from a vehicle side, the light receiving circuit switches the light detection signal from a level indicating no light reception to a level indicating light reception. The light detection signal delayed by the delay circuit is input to the switch input circuit. Therefore, during a period (failure determination period) from the start of the light reception of the optical signal to elapse of a delay time by the delay circuit, a delayed light detection signal of a level indicating no light reception is input to the switch input circuit, and an on-off signal of a turn-on level is output. Therefore, in the failure determination period, the turn-on signal is output from the logic circuit regardless of on and off of the switch, and the light emitting device emits light. When the light from the light emitting device of the seat unit cannot be confirmed during the failure determination period, a failure such as battery exhaustion can be detected on the vehicle side.

Further, during a period (switch input determination period) from elapse of the delay time to end of light reception of the optical signal from the vehicle side, an on-off signal corresponding to the on-off state of the switch is output from the switch input circuit. Therefore, when the on-off signal of a turn-on level is output in the switch input determination period, the turn-on signal is output from the logic circuit, and the light emitting device is turned on. The on-off state of the switch can be discriminated on the vehicle side based on presence or absence of light from the light emitting device during the switch input determination period.

Moreover, power to the switch is cut off when the delayed light detection signal of a level indicating no light reception is input to the switch input circuit, and the power is not constantly supplied. Therefore, power saving can be achieved.

The seat unit (2) may further include an oscillation circuit (27) configured to oscillate, upon receipt of the turn-on signal (S3), to cause the light emitting device (251) to flash.

With this configuration, the light emitting device can be caused to flash by providing the oscillation circuit.

The seat unit (2) may further include a switch element (Tr1) including a control terminal, the switch element (Tr1) being configured to turn the power supply from the battery (6) to the light detecting device (221A) on and off depending on a level of input to the control terminal, and a rectangular wave output circuit (28) configured to regularly output a rectangular wave signal (S7) in two levels. The control terminal of the switch element (Tr1) is arranged to receive both the on-off signal (S2) and the rectangular wave signal (S7). The switch element (Tr1) is configured to turn on the supply power to the light detecting device (221A) when the level of input to the control terminal is the same as the turn-on level.

With this configuration, power is supplied to the light detecting device every time the rectangular wave signal is at the turn-on level (e.g., a "Lo level"). When the light detecting device receives light at the time the rectangular wave signal is at a Lo level, an on-off signal of a Lo level is output from the light receiving circuit. Therefore, even when the rectangular wave signal is at a Hi level, power supply to the light detecting device is maintained, and output of the on-off signal of a Lo level is continued. Therefore, intermittent power supply to the light detecting device can be performed, and power saving can be achieved.

What is claimed is:

1. A seat unit configured to be mounted on a seat of a vehicle and to receive power supply from a battery to operate, the seat unit comprising:
   a light receiving circuit including a light detecting device, the light receiving circuit being configured to output a pulsed light detection signal in two levels depending on whether the light detecting device is detecting a light reception;
   a switch input circuit configured to output a pulsed on-off signal in two levels depending on whether a switch mounted on the seat is turned on or turned off;
   a logic circuit configured to output a turn-on signal upon receipt of the light detection signal in a level indicating the light reception and the on-off signal in a turn-on level, the turn-on level being one of the two levels of the on-off signal;
   a light emitting circuit including a light emitting device, and the light emitting circuit being configured to cause the light emitting device to emit light upon receipt of the turn-on signal; and
   a delay circuit configured to delay the light detection signal,
   wherein the switch input circuit is configured to cut off, upon receipt of the delayed light detection signal in a level indicating no light reception, the power supply from the battery to the switch and to output the on-off signal in the turn-on level.

2. The seat unit according to claim 1, further comprising an oscillation circuit configured to oscillate, upon receipt of the turn-on signal, to cause the light emitting device to flash.

3. The seat unit according to claim 1, further comprising:
   a rectangular wave output circuit configured to regularly output a rectangular wave signal in two levels,
   wherein the light receiving circuit comprises a switch element including a control terminal, the switch element being configured to turn the power supply from the battery to the light detecting device on and off depending on a level of input to the control terminal;

wherein the control terminal of the switch element is arranged to receive both the on-off signal and the rectangular wave signal, and wherein the switch element is configured to turn on the supply power to the light detecting device when the level of input to the control terminal is the same as the turn-on level.

4. The seat unit according to claim 2, further comprising:

a rectangular wave output circuit configured to regularly output a rectangular wave signal in two levels, wherein the light receiving circuit comprises a switch element including a control terminal, the switch element being configured to turn the power supply from the battery to the light detecting device on and off depending on a level of input to the control terminal;

wherein the control terminal of the switch element is arranged to receive both the on-off signal and the rectangular wave signal, and wherein the switch element is configured to turn on the supply power to the light detecting device when the level of input to the control terminal is the same as the turn-on level.

* * * * *